United States Patent
Zhang et al.

(10) Patent No.: US 9,548,860 B2
(45) Date of Patent: Jan. 17, 2017

(54) ASYMMETRIC-COMPUTING TYPE SHARED KEY ESTABLISHING METHOD SUITABLE FOR CLOUD COMPUTING AND IOT

(71) Applicant: WUHAN UNIVERSITY, Wuhan/Hubei (CN)

(72) Inventors: Huanguo Zhang, Wuhan/Hubei (CN); Shaowu Mao, Wuhan/Hubei (CN); Houzhen Wang, Wuhan/Hubei (CN); Wanqing Wu, Wuhan/Hubei (CN); Jinhui Liu, Wuhan/Hubei (CN); Jianwei Jia, Wuhan/Hubei (CN)

(73) Assignee: Wuhan University, Wuhan (CN)

( * ) Notice: Subject to any disclaimer, the term of this patent is extended or adjusted under 35 U.S.C. 154(b) by 0 days.

(21) Appl. No.: 14/724,809

(22) Filed: May 29, 2015

(65) Prior Publication Data
US 2015/0358157 A1     Dec. 10, 2015

(30) Foreign Application Priority Data
Jun. 5, 2014 (CN) .......................... 2014 1 0246482

(51) Int. Cl.
*H04L 9/08* (2006.01)

(52) U.S. Cl.
CPC ........... *H04L 9/0838* (2013.01); *H04L 9/0841* (2013.01); *H04L 9/0852* (2013.01)

(58) Field of Classification Search
CPC .............................. H04L 9/0838; H04L 9/0841
USPC ........................................................ 380/278
See application file for complete search history.

(56) References Cited

U.S. PATENT DOCUMENTS

| | | | | |
|---|---|---|---|---|
| 2013/0013921 | A1* | 1/2013 | Bhathena | H04L 9/0825 713/168 |
| 2014/0195804 | A1* | 7/2014 | Hursti | H04L 63/0428 713/168 |
| 2015/0113277 | A1* | 4/2015 | Harkins | H04L 9/083 713/171 |

* cited by examiner

*Primary Examiner* — Hadi Armouche
*Assistant Examiner* — Angela Holmes
(74) *Attorney, Agent, or Firm* — Wang Law Firm, Inc.

(57) ABSTRACT

An asymmetric-computing type shared key establishing method suitable for cloud computing and IoT has the following advantages. The realization efficiency and the security level are high, and a cryptographic algorithm coprocessor is not needed. The method can be applied to occasions in which the computing capabilities are asymmetric, and attacks from quantum computers can be resisted. Compared with a conventional key exchange protocol such as the Diffie-Hellman key exchange protocol, the method can be more effective between servers and mobile equipment in the security fields as the IoT and cloud computing, and the method can be used in both the electronic environment and the quantum environment. Thus, the asymmetric-computing type shared key establishing method suitable for cloud computing and IoT provided by the invention can be widely applied to the field of information security systems such as network security and e-commerce.

2 Claims, 2 Drawing Sheets

ASYMMETRIC-COMPUTING TYPE SHARED KEY ESTABLISHING METHOD SUITABLE FOR CLOUD COMPUTING AND IOT

CROSS-REFERENCE TO RELATED APPLICATION

This application claims the benefit of China Patent Application No. 201410246482.9, filed on Jun. 5, 2014, in the State Intellectual Property Office of the People's Republic of China, the disclosure of which is incorporated herein in its entirety by reference.

BACKGROUND OF THE INVENTION

1. Field of the Invention

The invention belongs to the technical field of information security (IS), especially relating to an asymmetric-computing type shared key establishing method suitable for cloud computing and IoT.

2. Description of the Related Art

To solve the problem that key management is complex in a symmetric cryptosystem, Diffie and Hellman brought forward the concept of "public-key cryptosystem" innovatively in 1976 and indicated that secret information can be transmitted in a public channel. Compared with symmetric cryptograph, encryption and decryption algorithm in the public-key cryptosystem tend to be complex and low-efficiency, and are therefore not suitable for encrypting mass data directly. Generally, a shared conversation key is established by utilizing the public key cryptographic technology (i.e., a shared key establishment protocol), and then the conversation key serves as a key of the symmetric cryptograph to encrypt plaintext.

The Diffie-Hellman Key Exchange protocol provided in 1976 opens up a new area in public key cryptography. The Diffie-Hellman Key Exchange protocol is based on the discrete logarithm problem, and characterized in that two parties are in the peering environment and computation is symmetric, namely computation of the two parties is identical. With continuous development of the IT industry, the applications of the key exchange method keep changing, and the original Diffie-Hellman type key exchange method cannot be appropriately used between server and terminal, and between server and mobile equipment on occasions as cloud computing and Internet of Things (IoT). The two parties have great difference in computing resources and capabilities, and thus, a shared key exchange protocol with asymmetric computation is needed.

At present, quantum computers have appeared. Further development of the quantum computer may be a grave threat to the Diffie-Hellman Key Exchange protocol. Many existing protocols, such as the MQV protocol that serves as the IEEE P1363 standard, are formed by improving the Diffie-Hellman Key Exchange protocol, and most of the existing protocols are based on discrete logarithm or elliptic-curve discrete logarithm and thus, incapable of resisting attacks from the quantum computer. A shared key exchange protocol that can resist the attack from the quantum computer is needed. Anshel et al. brought forward a shared key protocol based on common non-commutative groups in 1999 and a double-party shared key exchange protocol in 2001; however, both the protocols are proved to be insecure. Ko et al. put forward the called Diffie-Hellman type conjugate problem (DHCP) in CRYPTO 2000, and further brought forward a Diffie-Hellman type bilateral shared key exchange protocol; however, Cheon et al. suggested a polynomial time algorithm to solve the DHCP in 2003, and Myasnikon et al. even provided a more effective solution. In PQCrypto 2010, Boucher et al. proposed another bilateral shared key exchange protocol which is based on special non-commutative multiplication polynomial, but the bilateral shared key exchange protocol by Boucher was challenged by Dubois and et al. later.

SUMMARY OF THE INVENTION

The invention aims at providing an asymmetric-computing type shared key establishing method suitable for cloud computing and IoT, which is secure in both the electronic computation and quantum computation environments, to solve the existing technical problems.

The asymmetric-computing type shared key establishing method suitable for cloud computing and IoT is characterized in that:

(I) A system is established by setting an ergodic matrix $Q \in F_q^{n \times n}$, selecting $x_1, \ldots, x_m \in F_{q^n}$ and $\overline{x}_1, \ldots, \overline{x}_m \in F_{q^n}$ randomly and uniformly, computing $Q_1 = Q^{x_1}, \ldots, Q_m = Q^{x_m}$ and $\overline{Q}_1 = Q^{\overline{x}_1}, \ldots, \overline{Q}_m = Q^{\overline{x}_m}$ in $F_q^{n \times n}$, and using $Q_1 = Q^{x_1}, \ldots, Q_m = Q^{x_m}$ and $\overline{Q}_1 = Q^{\overline{x}_1}, \ldots, \overline{Q}_m = Q^{\overline{x}_m}$ as public parameters, wherein $Q_1 = Q^{x_1}, \ldots, Q_m = Q^{x_m}$ are irreversible pairwise in $F_q^{n \times n}$, and $\overline{Q}_1 = Q^{\overline{x}_1}, \ldots, \overline{Q}_m = Q^{\overline{x}_m}$ are irreversible pairwise in $F_q^{n \times n}$;

(II) A and B are supposed to be two communication parties respectively, and the two communication parties establish a shared key in the following steps that:

1) A selects $$r = (r_1, \ldots, r_m) \in \{0,1\}^m \left( wt(r) = \left\lfloor \frac{m}{2} \right\rfloor \right)$$

randomly and uniformly, uses r as a private key, and computes $$\prod_{i=1}^{m} Q_i^{r_i} \text{ and } \prod_{i=1}^{m} \overline{Q}_i^{r_i}$$

in $F_q^{n \times n}$;

2) B selects $k, l \in F_{q^n}$ and $M \in F_q^{n \times n}$ randomly and uniformly, uses k, l, M as a private key, and computes $(Q_1^k \otimes_q M \otimes_q \overline{Q}_1^l, \ldots, Q_m^k \otimes_q M \otimes_q \overline{Q}_m^l)$;

3) A transmits $$\left( \prod_{i=1}^{m} Q_i^{r_i}, \prod_{i=1}^{m} \overline{Q}_i^{r_i} \right)$$

to B;

4) B transmits $(Q_1^k \otimes_q M \otimes_q \overline{Q}_1^l, \ldots, Q_m^k \otimes_q M \otimes_q \overline{Q}_m^l)$ to A;

5) A computes a shared key $$\text{key} = \prod_{i=1}^{m} \left( Q_i^k \otimes_q M \otimes_q \overline{Q}_i^{l} \right)^{r_i}$$

by utilizing the private key thereof; and

6) B computes a shared key $$\text{key} = \left[ \prod_{i=1}^{m} Q_i^{r_i} \right]^k \otimes_q M^{\lfloor \frac{m}{2} \rfloor} \otimes_q \left[ \prod_{i=1}^{m} \overline{Q}_i^{r_i} \right]^l$$

by utilizing the private key thereof; and (III) A and B obtain a shared key $$\prod_{i=1}^{m} Q_i^{kr_i} \otimes_q M^{\lfloor \frac{m}{2} \rfloor} \otimes_q \prod_{i=1}^{m} \overline{Q}_i^{lr_i}$$

via negotiation according to a secret key negotiation protocol;

The symbol "$\otimes_q$" represents the tensor product in the finite field, and matrix multiplications also work in finite field.

The asymmetric-computing type shared key establishing method suitable for cloud computing and IoT of the invention has the advantages that:

(1) The method includes the shared key exchange method of high security level. The security performance of the shared key exchange method is mainly based on tensor and ergodic matrix problems which are proved to be NPC problems. The problems satisfy non-communicative condition, and thus, the shared key exchange method has the potential for resisting attack from the quantum computers;

(2) The method includes the shared key exchange method of high efficiency. The shared key exchange method mainly comprises multiplication in the finite field, and table look-up can be used for multiplication if lower field parameters as $F_{2^8}$ are selected. The efficiency is higher, and the method can be widely applied to embedded equipment with a limited computation capability; and 3) The method includes the asymmetric-computing type shared key exchange method which is needed in many occasions with development of novel information technology as the Internet of Things and cloud computing. The new key exchange method can be used in the asymmetric scenario such as cloud computing, the internet of things, in which there are communications between server and terminal, server and mobile devices, which means that under the same security bits level, compared with classical key establishing method, one of two participants in new key establishing method needs less computations and less key storage. The method can also be applied to occasions with equal computation capabilities.

DETAILED DESCRIPTION OF THE PREFERRED EMBODIMENTS

Figure 1:
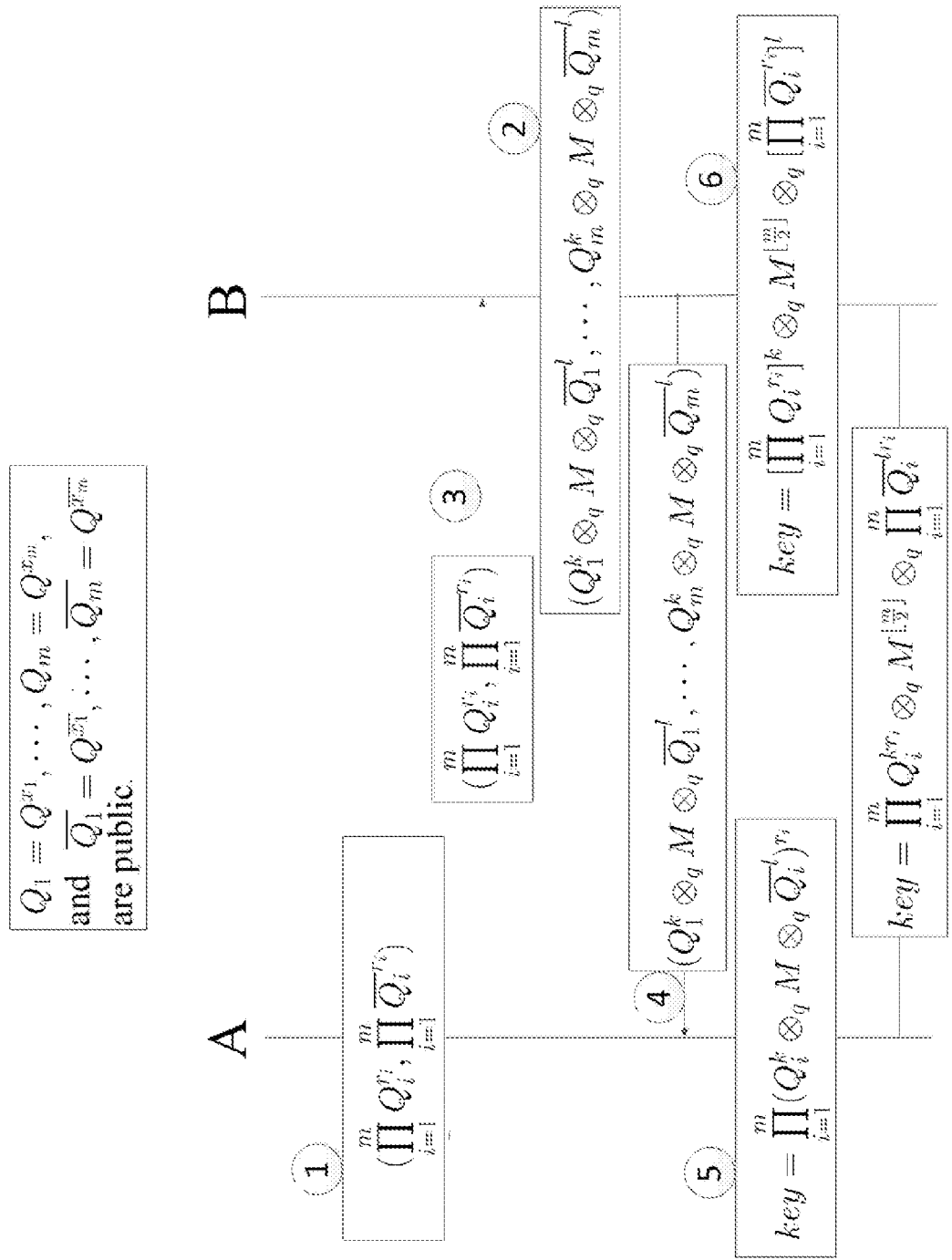
FIG. 1 shows the shared key establishing method in a quantum computation environment or an asymmetric scenario, provided by an embodiment of the invention.
Figure 2:
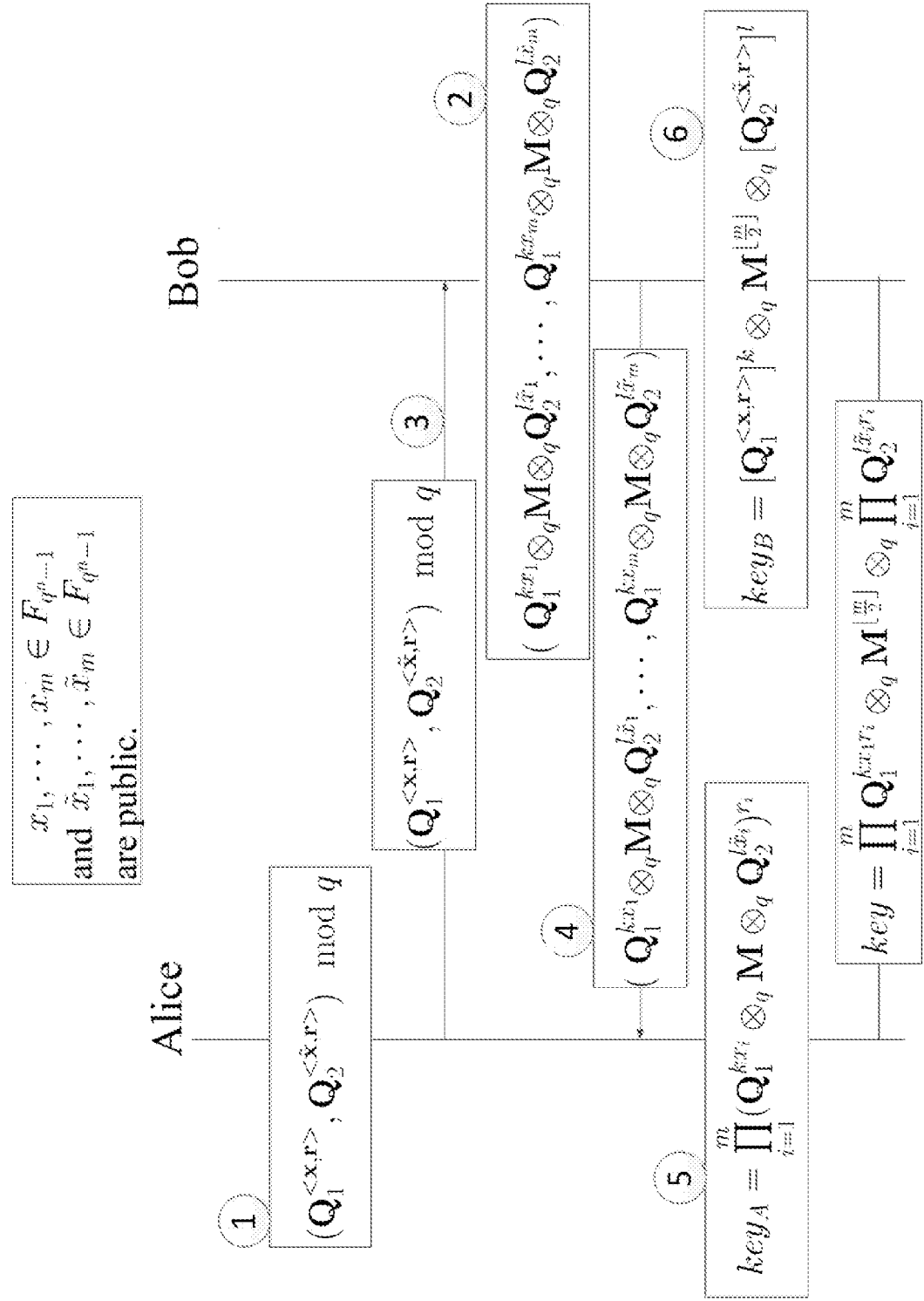
FIG. 2 shows the asymmetric-computing type shared key establishing construction diagram.

The asymmetric-computing type shared key establishing method suitable for cloud computing and IoT is further described in detail by utilizing the drawing together with the embodiment so that common technical staff in the field can understand and implement the method. The embodiment is used to explain the method; however, the method is not limited to the embodiment.

Example 1

As in FIG. 1, the asymmetric-computing type shared key establishing method suitable for cloud computing and IoT comprises that (I) A system is established by selecting parameters q=3, n=3 and m=3, setting an ergodic matrix $$Q = \begin{pmatrix} 0 & 1 & 0 \\ 0 & 0 & 1 \\ 1 & 0 & -1 \end{pmatrix}$$

in the finite field $F_3$, selecting $x_1=3$, $x_2=4$, $x_3=5$, $x_4=1 \epsilon F_8$, $\overline{x}_1=1$, $\overline{x}_2=5$, $\overline{x}_3=2$ and $\overline{x}_4=6 \epsilon F_8$, computing $$Q_1 = Q^3 = \begin{pmatrix} 1 & 0 & 2 \\ 2 & 1 & 1 \\ 1 & 2 & 0 \end{pmatrix}, Q_2 = Q^4 = \begin{pmatrix} 2 & 1 & 1 \\ 1 & 2 & 0 \\ 0 & 1 & 2 \end{pmatrix},$$

$$Q_3 = Q^5 = \begin{pmatrix} 1 & 2 & 0 \\ 0 & 1 & 2 \\ 2 & 0 & 2 \end{pmatrix} \text{ and } Q_4 = Q^1 = \begin{pmatrix} 0 & 1 & 0 \\ 0 & 0 & 1 \\ 1 & 0 & -1 \end{pmatrix}$$

as well as $$\overline{Q}_1 = Q^1 = \begin{pmatrix} 0 & 1 & 0 \\ 0 & 0 & 1 \\ 1 & 0 & -1 \end{pmatrix}, \overline{Q}_2 = Q^5 = \begin{pmatrix} 1 & 2 & 0 \\ 0 & 1 & 2 \\ 2 & 0 & 2 \end{pmatrix},$$

$$\overline{Q}_3 = Q^2 = \begin{pmatrix} 0 & 0 & 1 \\ 1 & 0 & 2 \\ 2 & 1 & 1 \end{pmatrix} \text{ and } \overline{Q}_4 = Q^6 = \begin{pmatrix} 0 & 1 & 2 \\ 2 & 0 & 2 \\ 2 & 2 & 1 \end{pmatrix},$$

and using the same as public parameters;

(II) A and B are supposed to be two communication parties respectively, and the two communication parties establish a shared key in the steps that:

1) A selects $r=(1, 0, 1, 0)^4$ randomly and uniformly, and computes $$\prod_{i=1}^{4} Q_i^{r_i} \text{ and } \prod_{i=1}^{4} \overline{Q}_i^{r_i};$$

2) B selects $2, 7 \epsilon F_{3^3}$ and $$M = \begin{pmatrix} 1 & 2 & 1 \\ 0 & 2 & 0 \\ 1 & 1 & 1 \end{pmatrix} \in F_3^{3\times 3}$$

randomly and uniformly, and computes $(Q_1^2 \otimes_3 M \otimes_3 \overline{Q}_1^7, \ldots, Q_4^2 \otimes_3 M \otimes_3 \overline{Q}_4^7)$;

3) A transmits $$(KA_1, KA_2) = \left( \prod_{i=1}^{4} Q_i^{r_i}, \prod_{i=1}^{4} \overline{Q}_i^{r_i} \right)$$

to B;

4) B transmits $(KB_1, KB_2, KB_3, KB_4) = (Q_1^2 \otimes_3 M \otimes_3 \overline{Q}_1^7, \ldots, Q_4^2 \otimes_3 M \otimes_3 \overline{Q}_4^7)$ to A;

5) A computes a shared key $$key_A = \prod_{i=1}^{m} (KB_i)^{r_i};$$

and

6) B computes a shared key $key_B = [KA_1]^2 \otimes_3 M^2 \otimes_3 [KA_2]^7$.

(III) Via negotiation, A and B can obtain a shared key in row 27 and column 27 of $$key = \begin{pmatrix} 1 & 1 & 2 & 2 & \ldots & 1 & 1 & 1 & 2 \\ 2 & 1 & 2 & 1 & \ldots & 1 & 2 & 1 & 2 \\ \vdots & \vdots & \vdots & \vdots & \ddots & \vdots & \vdots & \vdots & \vdots \\ 0 & 0 & 0 & 0 & \ldots & 1 & 1 & 1 & 1 \end{pmatrix},$$

Under the condition that the safety and description are not influenced, only part of the shared key is given to save space.

Example 2

The asymmetric-computing type shared key establishing method comprises that:

(I) System Established: For parameters $m > n^2 \log q$. Given two ergodic matrix $Q_1, Q_2 \epsilon F_q^{n\times n}$, choose uniformly at random $x = (x_1, \ldots, x_m) \epsilon F_{q^n-1}^m$ and $\tilde{x} = (\tilde{x}_1, \ldots, \tilde{x}_m) \epsilon F_{q^n-1}^m$ (for any $i \neq j$, $x_i + x_j \neq 0 \mod (q^n - 1)$, $\tilde{x}_i + \tilde{x}_j \neq 0 \mod (q^n - 1)$), take $x, \tilde{x}$ as public parameters.

(II) Establish the sharing key, Alice and Bob need interaction as following.

(1) Alice chooses uniformly at random $$r = (r_1, \ldots, r_m) \in \{0, 1\}^m \left( wt(r) = \left\lfloor \frac{m}{2} \right\rfloor \right),$$

compute $(Q_1^{<x,r>}, Q_2^{<\tilde{x},r>}) \mod q$ and take r as private.

(2) Bob chooses uniformly at random $k, l \epsilon F_{q^n-1}$ and a random dense matrix $M \epsilon F_q^{n\times n}$, compute $(Q_1^{kx_1} \otimes_q M \otimes_q Q_2^{l\tilde{x}_1}, \ldots, Q_1^{kx_m} \otimes_q M \otimes_q Q_x^{l\tilde{x}_m})$ and take k, l, M as private.

(3) Alice sends $(Q_1^{<x,r>}, Q_2^{<\tilde{x},r>}) \mod q$ to Bob.

(4) Bob sends $(Q_1^{kx_1} \otimes_q M \otimes_q Q_2^{l\tilde{x}_1}, \ldots, Q_1^{kx_m} \otimes_q M \otimes_q Q_2^{l\tilde{x}_m})$ to Alice.

(5) Alice computes $$key_A = \prod_{i=1}^{m} (Q_1^{kx_i} \otimes_q M \otimes_q Q_2^{l\tilde{x}_i})^{r_i}.$$

(6) Bob computes $$key_B = [Q_1^{<x,r>}]^k \otimes_q M^{\lfloor \frac{m}{2} \rfloor} \otimes_q [Q_2^{<\tilde{x},r>}]^l.$$

(III) Through the exchange method, Alice and Bob negotiate a common key $$\prod_{i=1}^{m} Q_1^{kx_i r_i} \otimes_q M^{\lfloor \frac{m}{2} \rfloor} \otimes_q \prod_{i=1}^{m} Q_2^{l\tilde{x}_i r_i}.$$

The symbol "$\otimes_q$" represents the tensor product in the finite field.

To explain simply and clearly about the shared key exchange method, we choose a simple instance. Where the chosen parameters are $q=3$, $n=3$, $m=3$. Given two primitive polynomial $p_1(x) = p_2(x) = x^3 + x^2 - 1$ of degree 3 in a finite field $\mathbb{Z}_3$, its corresponding companion matrix (ergodic matrix) is $$Q_1 = Q_2 = \begin{pmatrix} 0 & 1 & 0 \\ 0 & 0 & 1 \\ 1 & 0 & -1 \end{pmatrix},$$

choose $x = (x_1, x_2, x_3, x_4) = (3, 4, 5, 1) \epsilon F_{3^3-1}$, $\tilde{x} = (\tilde{x}_1, \tilde{x}_2, \tilde{x}_3, \tilde{x}_4) = (1, 2, 5, 6) \epsilon F_{3^3-1}$, take $x, \tilde{x}$ as public parameters. The procedure of shared key exchange method are as following:

(1) Alice chooses uniformly at random $r = (1, 0, 1, 0)^4$, computes $Q_1^{<x,r>} \mod 3$ and $Q_2^{<\tilde{x},r>} \mod 3$.

(2) Bob chooses uniformly at random $2, 7 \epsilon F_{3^3-1}$ and $$M = \begin{pmatrix} 1 & 2 & 1 \\ 0 & 2 & 0 \\ 1 & 1 & 1 \end{pmatrix} \in F_3^{3\times 3},$$

computes $(Q_1^{2x_1} \otimes_3 M \otimes_3 Q_2^{7\tilde{x}_1}, \ldots, Q_1^{2x_4} \otimes_3 M \otimes_3 Q_2^{7\tilde{x}_4})$.

(3) Alice sends $(KA_1, KA_2) = (Q_1^{<x,r>}, Q_2^{<\tilde{x},r>}) \mod q$ to Bob.

(4) Bob sends $(KB_1, KB_2, KB_3, KB_4) = (Q_1^6 \otimes_3 M \otimes_3 Q_2^{17}, \ldots, Q_1^2 \otimes_3 M \otimes_3 Q_2^{15})$ to Alice.

(5) Alice computes $$key_A = \prod_{i=1}^{m} (KB_i)^{r_i} \mod q.$$

(6) Bob computes $key_B = [KA_1]^2 \otimes_3 M^2 \otimes_3 [KA_2]^7$.

Alice and Bob can obtain the shared key through interactions:

$$key = \begin{pmatrix} 1 & 1 & 2 & 2 & \ldots & 1 & 1 & 1 & 2 \\ 2 & 1 & 2 & 1 & \ldots & 1 & 2 & 1 & 2 \\ \vdots & \ddots & \ddots & \ddots & \ddots & \ddots & \ddots & \vdots \\ 0 & 0 & 0 & 0 & \ldots & 1 & 1 & 1 & 1 \end{pmatrix}$$

The dimension of shared key is 27 rows 27 columns. Under the precondition of without affecting security and explanation, in order not to occupy more space, only parts of the shared key are given.

Parts, which may not mentioned in the description, also belong to the method.

The embodiment is described in a detailed manner to be better understood; however, the method is not limited to the embodiment. Substitutes for the method or the method in other forms are both within the protection scope. The protective scope is referred in the Claims.

What is claimed is:

1. A asymmetric-computing type shared key establishing method suitable for cloud computing and IoT, performing by mobile device A and server B each of which has a processor and a memory, and computation capability of the mobile device A being less than computation capability of the server B, the asymmetric-computing type shared key establishing method comprising the following steps:

setting an ergodic matrix $Q \in F_q^{n \times n}$, selecting $x_1, \ldots, x_m \in F_{q^n}$ and $\overline{x_1}, \ldots, \overline{x_m} \in F_{q^n}$ randomly and uniformly, computing $Q_1 = Q^{x_1}, \ldots, Q_m = Q^{x_m}$ and $\overline{Q_1} = Q^{\overline{x_1}}, \ldots, \overline{Q_m} = Q^{\overline{x_m}}$ in $F_q^{n \times n}$, and using $Q_1 = Q^{x_1}, \ldots, Q_m = Q^{x_m}$ and $\overline{Q_1} = Q^{\overline{x_1}}, \ldots, \overline{Q_m} = Q^{\overline{x_m}}$ as public parameters, wherein $Q_1 = Q^{x_1}, \ldots, Q_m = Q^{x_m}$ are irreversible pairwise in $F_q^{n \times n}$, and $\overline{Q_1} = Q^{\overline{x_1}}, \ldots, \overline{Q_m} = Q^{\overline{x_m}}$ are irreversible pairwise in $F_q^{n \times n}$;

establishing a shared key by the mobile device A and the server B in the following steps that:

mobile device A selects $$r = (r_1, \ldots, r_m) \in \{0, 1\}^m \left( wt(r) = \left\lfloor \frac{m}{2} \right\rfloor \right)$$

randomly and uniformly, uses r as a private key, and computes $$\prod_{i=1}^m Q_i^{r_i} \text{ and } \prod_{i=1}^m \overline{Q}_i^{r_i}$$

in $F_q^{n \times n}$;

server B selects $k, l \in F_{q^n}$ and $M \in F_q^{n \times n}$ randomly and uniformly, uses k, l, M as a private key, and computes $(Q_1^k \otimes_q M \otimes_q \overline{Q}_1^l, \ldots, Q_m^k \otimes_q M \otimes_q \overline{Q}_m^l)$;

mobile device A transmits $$\left( \prod_{i=1}^m Q_i^{r_i}, \prod_{i=1}^m \overline{Q}_i^{r_i} \right)$$

to server B;

server B transmits $(Q_1^k \otimes_q M \otimes_q \overline{Q}_1^l, \ldots, Q_m^k \otimes_q M \otimes_q \overline{Q}_m^l)$ to mobile device A;

mobile device A computes a shared key $$\prod_{i=1}^m (Q_i^k \otimes_q M \otimes_q \overline{Q}_i^l)^{r_i}$$

by utilizing the private key thereof;

server B computes a shared key $$\left[ \prod_{i=1}^m Q_i^{r_i} \right]^k \otimes_q M^{\left\lfloor \frac{m}{2} \right\rfloor} \otimes_q \left[ \prod_{i=1}^m \overline{Q}_i^{r_i} \right]^l$$

by utilizing the private key thereof;

obtaining a shared key $$\prod_{i=1}^m Q_i^{kr_i} \otimes_q M^{\left\lfloor \frac{m}{2} \right\rfloor} \otimes_q \prod_{i=1}^m \overline{Q}_i^{lr_i}$$

by the mobile device A and the server B via negotiation according to a secret key negotiation protocol, the negotiation in mobile device A being accomplished within a required time;

performing data communication between the mobile device A and the server B, the data being encrypted by a sender among the mobile device A and the server B, and then decrypted by a recipient among the mobile device A and the server B, both with the shared key $$\prod_{i=1}^m Q_i^{kr_i} \otimes_q M^{\left\lfloor \frac{m}{2} \right\rfloor} \otimes_q \prod_{i=1}^m \overline{Q}_i^{lr_i};$$

and encrypting outgoing data stream using the shared key and establishing a secure communication in cloud computing and IoT environment, wherein, the symbol "$\otimes_q$" represents the tensor product in the finite field, and matrix multiplications also work in finite field.

2. A non-transitory computer readable memory storing a plurality of instructions for controlling a communication system to establish an asymmetric-computing type shared key suitable for cloud computing and IoT, the plurality of instructions being executed by processors comprised in a mobile device A and a server B, and computation capability of the mobile device A being less than computation capability of the server B, the plurality of instructions comprising the following steps:

setting an ergodic matrix $Q \in F_q^{n \times n}$, selecting $x_1, \ldots, x_m \in F_{q^n}$ and $\overline{x_1}, \ldots, \overline{x_m} \in F_{q^n}$ randomly and uniformly, computing $Q_1 = Q^{x_1}, \ldots, Q_m = Q^{x_m}$ and $\overline{Q_1} = Q^{\overline{x_1}}, \ldots, \overline{Q_m} = Q^{\overline{x_m}}$ in $F_q^{n \times n}$, and using $Q_1 = Q^{x_1}, \ldots, Q_m = Q^{x_m}$ and $\overline{Q_1} = Q^{\overline{x_1}}, \ldots, \overline{Q_m} = Q^{\overline{x_m}}$ as public parameters, wherein $Q_1 = Q^{x_1}, \ldots, Q_m = Q^{x_m}$ are irreversible pairwise in $F_q^{n \times n}$, and $\overline{Q_1} = Q^{\overline{x_1}}, \ldots, \overline{Q_m} = Q^{\overline{x_m}}$ are irreversible pairwise in $F_q^{n \times n}$;

establishing a shared key by the mobile device A and the server B in the following steps that:

mobile device A selects $$r = (r_1, \ldots, r_m) \in \{0, 1\}^m \left(wt(r) = \left\lfloor \frac{m}{2} \right\rfloor\right)$$

randomly and uniformly, uses r as a private key, and computes $$\prod_{i=1}^{m} Q_i^{r_i} \text{ and } \prod_{i=1}^{m} \overline{Q_i^{r_i}} \text{ in } F_q^{a \times n};$$

server B selects k, $l \in F_{q^n}$ and $M \in F_q^{n \times n}$ randomly and uniformly, uses k, l, M as a private key, and computes $(Q_1^k \otimes_q M \otimes_q \overline{Q_1^l}, \ldots, Q_m^k \otimes_q M \otimes_q \overline{Q_m^l})$;

mobile device A transmits $$\left( \prod_{i=1}^{m} Q_i^{r_i}, \prod_{i=1}^{m} \overline{Q_i^{r_i}} \right)$$

to server B;

server B transmits $(Q_1^k \otimes_q M \otimes_q \overline{Q_1^l}, \ldots, Q_m^k \otimes_q M \otimes_q \overline{Q_m^l})$ to mobile device A;

mobile device A computes a shared key $$\prod_{i=1}^{m} (Q_i^k \otimes_q M \otimes_q \overline{Q_i^l})^{r_i}$$

by utilizing the private key thereof; and server B computes a shared key $$\left[ \prod_{i=1}^{m} Q_i^{r_i} \right]^k \otimes_q M^{\left\lfloor \frac{m}{2} \right\rfloor} \otimes_q \left[ \prod_{i=1}^{m} \overline{Q_i^{r_i}} \right]^l$$

by utilizing the private key thereof;

obtaining a shared key $$\prod_{i=1}^{m} Q_i^{kr_i} \otimes_q M^{\left\lfloor \frac{m}{2} \right\rfloor} \otimes_q \prod_{i=1}^{m} \overline{Q_i^{lr_i}}$$

by the mobile device A and the server B via negotiation according to a secret key negotiation protocol, the negotiation in mobile device A being accomplished within a required time; and performing data communication between the mobile device A and the server B, the data being encrypted by a sender among the mobile device A and the server B, and then decrypted by a recipient among the mobile device A and the server B, both with the shared key $$\prod_{i=1}^{m} Q_i^{kr_i} \otimes_q M^{\left\lfloor \frac{m}{2} \right\rfloor} \otimes_q \prod_{i=1}^{m} \overline{Q_i^{lr_i}};$$

and encrypting outgoing data stream using the shared key and establishing a secure communication in cloud computing and IoT environment, wherein, the symbol "$\otimes_q$" represents the tensor product in the finite field, and matrix multiplications also work in finite field.

* * * * *